United States Patent
Cho (10) Patent No.: US 12,447,873 B2
(45) Date of Patent: Oct. 21, 2025

(54) DEVICE FOR ADJUSTING ANGLE OF SEATBACK FOR VEHICLES

(71) Applicant: HYUNDAI TRANSYS INC., Seosan-si (KR)

(72) Inventor: Jae Hoon Cho, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 210 days.

(21) Appl. No.: 18/536,506

(22) Filed: Dec. 12, 2023

(65) Prior Publication Data
US 2024/0190308 A1 Jun. 13, 2024

(30) Foreign Application Priority Data
Dec. 13, 2022 (KR) .................. 10-2022-0173441

(51) Int. Cl.
*B60N 2/20* (2006.01)
*B60N 2/22* (2006.01)

(52) U.S. Cl.
CPC .......... *B60N 2/2227* (2013.01); *B60N 2/206* (2013.01); *B60N 2/2236* (2013.01)

(58) Field of Classification Search
CPC .. B60N 2/2236; B60N 2/2218; B60N 2/2227; B60N 2/206
See application file for complete search history.

(56) References Cited

U.S. PATENT DOCUMENTS

| | | | | |
|---|---|---|---|---|
| 3,007,737 A * | 11/1961 | Lichter | .................. | A47C 7/407 16/374 |
| 6,641,214 B2 * | 11/2003 | Veneruso | ........... | B60N 2/02246 297/343 |
| 7,121,624 B2 * | 10/2006 | Pejathaya | ............ | B60N 2/3065 297/331 |

(Continued)

FOREIGN PATENT DOCUMENTS

| | | | | |
|---|---|---|---|---|
| DE | 102023129208 A1 * | 4/2025 | ......... | F16M 11/2021 |
| EP | 1970248 A1 * | 9/2008 | ........... | B60N 2/0843 |

(Continued)

OTHER PUBLICATIONS

Thang01046, '180 deg. concealed hinge2,' https://youtu.be/tSpiNDotdlo?si=G1Y6zq0xUmE0eMf3, Jun. 5, 2019, YouTube.

*Primary Examiner* — Timothy J Brindley
(74) *Attorney, Agent, or Firm* — Quantum Patent Law Firm; Seongyoune Kang (57) ABSTRACT

Disclosed is a device for adjusting an angle of a seatback for vehicles. The device includes a seat cushion unit including a locking part, a seatback unit rotatably connected to the seat cushion unit, and a link unit connecting the seat cushion unit to the seatback unit. The link unit includes an upper link part including an end fixed to the seat cushion unit to function as a rotation center axis and another end inserted into a back slot portion formed in the seatback unit, a lower link part including an end fixed to the seatback unit and another end inserted into a cushion slot portion formed in the seat cushion unit to be engaged with the locking part, and a joint (Continued)

part to which the upper and lower link parts are coupled. The seatback unit is rotated forward or backward by rotation of the upper and lower link parts.

15 Claims, 9 Drawing Sheets

(56) References Cited

U.S. PATENT DOCUMENTS

| | | | |
|---|---|---|---|
| 7,703,851 B2* | 4/2010 | Nakaya | B60N 2/34 |
| | | | 297/344.15 |
| 10,065,535 B1* | 9/2018 | Line | B60N 2/643 |
| 10,513,204 B2* | 12/2019 | Ewel | B60N 2/502 |
| 10,843,599 B2* | 11/2020 | Arico | B60N 2/3093 |
| 11,833,937 B2* | 12/2023 | Miller | B60N 2/2222 |
| 2022/0267008 A1* | 8/2022 | Shiels | B64D 11/064 |

FOREIGN PATENT DOCUMENTS

| | | | | |
|---|---|---|---|---|
| KR | 10-2008-0083132 A | | 9/2008 | |
| KR | 10-20213-0072016 A | | 7/2013 | |
| KR | 10-2017-0121229 A | | 11/2017 | |
| KR | 20230061083 A | * | 5/2023 | ........... B60N 2/2236 |
| WO | WO-2008072728 A1 | * | 6/2008 | ........... B60N 2/2236 |

* cited by examiner

FIG. 9

DEVICE FOR ADJUSTING ANGLE OF SEATBACK FOR VEHICLES

CROSS-REFERENCE TO RELATED APPLICATION

This application under 35 U.S.C. § 119(a) claims priority to Korean Patent Application No. 10-2022-0173441, filed on Dec. 13, 2022, the entire contents of which are incorporated herein by reference.

BACKGROUND

(a) Technical Field

The present disclosure relates to a device for adjusting an angle of a seatback for vehicles. More particularly, it relates to a device for adjusting an angle of a seatback for vehicles, which may increase an angle adjustment range of the seatback according to requirements of an occupant, may improve the comfort of an occupant by reducing a step between a seat cushion and the seatback when the seatback is fully unfolded, and may secure an interior space of a vehicle to the maximum when the seatback is unfolded or folded.

(b) Background Art

In general, a vehicle seat includes a seatback that supports the back of an occupant and a seat cushion that supports the buttocks of an occupant. The seatback supporting the back of an occupant is configured to be adjustable in angle back and forth by a recliner.

Typically, a recliner is a device that allows a seatback to be rotated forward and backward and fixed within a predetermined angle range. Such a recliner serves to stably support an occupant seated in a seat with a seatback rotated.

A conventional reclining device enables adjustment of the angle of a seatback in a forward-backward direction with respect to a seat cushion through rotation of the seatback about a point of connection to the seat cushion. Such a conventional reclining device may be generally classified into a manual-type reclining device that adjusts the angle of a seatback through manual operation of a lever by an occupant and a power-type reclining device that automatically operates using power of a motor in response to operation of a switch.

However, when the angle of the seatback is adjusted such that the seatback is fully unfolded, a step is present between the seatback and the seat cushion due to a link structure of the conventional reclining device, and this step may cause discomfort to an occupant seated in a seat.

The above information disclosed in this Background section is only for enhancement of understanding of the background, and therefore it may contain information that does not form the related art that is already known in this country to a person of ordinary skill in the art.

SUMMARY OF THE DISCLOSURE

The present device has been made in an effort to solve the above-described problems associated with the related art, and it is an object of the present device to provide a device for adjusting an angle of a seatback for vehicles, in which a dual-link-unit structure is employed in order to increase a seatback adjustment range according to a body condition of an occupant.

It is another object of the present device to provide a device for adjusting an angle of a seatback for vehicles, which may improve the comfort of an occupant by reducing a step between a seat cushion and the seatback when the seatback is fully unfolded and may secure an interior space of a vehicle to the maximum when the seatback is unfolded or folded.

The objects of the present device are not limited to the above-mentioned objects, and other objects not mentioned herein will be clearly understood by those skilled in the art from the following description, and will become apparent with reference to the embodiments of the present device. In addition, the objects of the present device can be accomplished by the components described in the appended claims and combinations thereof.

In one aspect, the present disclosure provides a device for adjusting an angle of a seatback for vehicles, the device including a seat cushion unit including a locking part, a seatback unit rotatably connected to the seat cushion unit, and a link unit connecting the seat cushion unit to the seatback unit, wherein the link unit includes an upper link part including an end fixed to the seat cushion unit to function as a rotation center axis and another end inserted into a back slot portion formed in the seatback unit, a lower link part including an end fixed to the seatback unit and another end inserted into a cushion slot portion formed in the seat cushion unit to be engaged with the locking part, and a joint part configured to allow the upper link part and the lower link part to be coupled thereto, and wherein the seatback unit is rotated forward or backward by rotation of the upper link part and the lower link part.

In a preferred embodiment, the upper link part may include an upper link including an end fixed to the seat cushion unit and another end formed to be rotatable about the end thereof and an upper slide link connected to the other end of the upper link and inserted into the back slot portion so as to be moved along the back slot portion while being rotated along with rotation of the upper link, and the lower link part may include a lower link including an end fixed to the seatback unit and another end about which the end thereof is rotated and a lower slide link connected to the other end of the lower link and inserted into the cushion slot portion so as to be moved along the cushion slot portion when unlocked from the locking part.

In another preferred embodiment, when the seatback unit is rotated forward, the seatback unit may be additionally rotated about the end of the lower link simultaneously with rotation of the upper link, the upper slide link may move to an end of the back slot portion close to the seat cushion unit, and the lower slide link may move to an end of the cushion slot portion close to the seatback unit.

In still another preferred embodiment, when the seatback unit is rotated backward, the seatback unit may be additionally rotated about the end of the lower link simultaneously with rotation of the upper link, the upper slide link may move to the other end of the back slot portion far from the seat cushion unit, and the lower slide link may move to the other end of the cushion slot portion far from the seatback unit.

In yet another preferred embodiment, the locking part may include a locking bracket located in the seat cushion unit to be engaged with the lower slide link and a locking lever located outside the seat cushion unit to be connected to the locking bracket via a cable.

In still yet another preferred embodiment, when the locking lever is operated and the seatback unit is rotated forward about the end of the upper link, the other end of the upper link may be rotated upward about the end thereof, and the lower link may receive rotational force from the upper link through the joint part so that the end thereof is rotated upward simultaneously with the upper link.

In a further preferred embodiment, the upper slide link may be located at one end of the back slot portion, and the lower slide link may be located at one end of the cushion slot portion.

In another further preferred embodiment, when the locking lever is operated and the seatback unit is rotated backward about the end of the upper link, the other end of the upper link may be rotated downward about the end thereof, and the lower link may receive rotational force from the upper link through the joint part so that the end thereof is rotated downward simultaneously with the upper link.

In still another further preferred embodiment, the upper slide link may be located at the other end of the back slot portion, and the lower slide link may be located at the other end of the cushion slot portion.

In another aspect, the present disclosure provides a device for adjusting an angle of a seatback for vehicles, the device including a seat cushion unit including a driving unit, a seatback unit rotatably connected to the seat cushion unit, and a link unit connecting the seat cushion unit to the seatback unit, wherein the link unit includes an upper link part including an end fixed to the seat cushion unit to function as a rotation center axis and another end inserted into a back slot portion formed in the seatback unit, a lower link part including an end fixed to the seatback unit and another end inserted into a cushion slot portion formed in the seat cushion unit to be engaged with the driving unit, and a joint part configured to allow the upper link part and the lower link part to be coupled thereto, and wherein the seatback unit is rotated forward or backward by rotation of the upper link part and the lower link part.

In a preferred embodiment, the upper link part may include an upper link including an end fixed to the seat cushion unit and another end formed to be rotatable about the end thereof and an upper slide link connected to the other end of the upper link and inserted into the back slot portion so as to be moved along the back slot portion while being rotated along with rotation of the upper link, and the lower link part may include a lower link including an end fixed to the seatback unit and another end about which the end thereof is rotated and a lower slide link connected to the other end of the lower link and inserted into the cushion slot portion so as to be moved along the cushion slot portion upon receiving driving force from the driving unit.

In another preferred embodiment, when the driving unit applies driving force to the lower slide link so that the lower slide link is moved backward, the other end of the upper link may be rotated upward about the end thereof, and the lower link may receive rotational force from the upper link through the joint part so that the end thereof is rotated upward simultaneously with the upper link.

In still another preferred embodiment, the upper slide link may be located at one end of the back slot portion, the lower slide link may be located at one end of the cushion slot portion, and the seatback unit may be rotated forward about the end of the upper link.

In yet another preferred embodiment, when the driving unit applies driving force to the lower slide link so that the lower slide link is moved forward, the other end of the upper link may be rotated downward about the end thereof, and the lower link may receive rotational force from the upper link through the joint part so that the end thereof is rotated downward simultaneously with the upper link.

In still yet another preferred embodiment, the upper slide link may be located at the other end of the back slot portion, the lower slide link may be located at the other end of the cushion slot portion, and the seatback unit may be rotated backward about the end of the upper link.

Other aspects and preferred embodiments of the present device are discussed infra.

It is understood that the term "vehicle" or "vehicular" or other similar terms as used herein are inclusive of motor vehicles in general such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present device are discussed infra.

BRIEF DESCRIPTION OF THE DRAWINGS

The above and other features of the present device will now be described in detail with reference to certain exemplary embodiments thereof illustrated in the accompanying drawings which are given hereinbelow by way of illustration only, and thus are not limitative of the present device, and wherein.

It should be understood that the appended drawings are not necessarily to scale, presenting a somewhat simplified representation of various preferred features illustrative of the basic principles of the device. The specific design features of the present device as disclosed herein, including, for example, specific dimensions, orientations, locations, and shapes, will be determined in part by the particular intended application and use environment.

In the figures, reference numbers refer to the same or equivalent parts of the present device throughout the several figures of the drawing.

DETAILED DESCRIPTION

Hereinafter, exemplary embodiments of the present device will be described in detail with reference to the accompanying drawings. The present device may, however, be embodied in many different forms, and should not be construed as being limited to the embodiments set forth herein. Rather, these embodiments are provided so that the present device will be thorough and complete, and will fully convey the scope of the present device to those skilled in the art.

The terms "part" and "unit" used in the specification mean units for processing at least one function or operation, and can be implemented by hardware components or combinations of hardware components.

In addition, the term "upper portion" as used herein means a direction toward the upper end in the vertical direction in the drawing, and the term "lower portion" as used herein means a direction toward the lower end in the vertical direction in the drawing.

In addition, the term "front portion" as used herein means a front side of a vehicle in the longitudinal direction in a mounted state of a seat therein, and the term "rear portion" as used herein means a rear side of a vehicle in the longitudinal direction in a mounted state of a seat therein.

In the specification, it will be understood that, when an element is referred to as being "on" or "above" another element, it may be directly on the other element, or an intervening element may also be present therebetween. Furthermore, it will be understood that, when an element is referred to as being "under" or "below" another element, it may be directly under the other element, or an intervening element may also be present therebetween.

Figure 1:
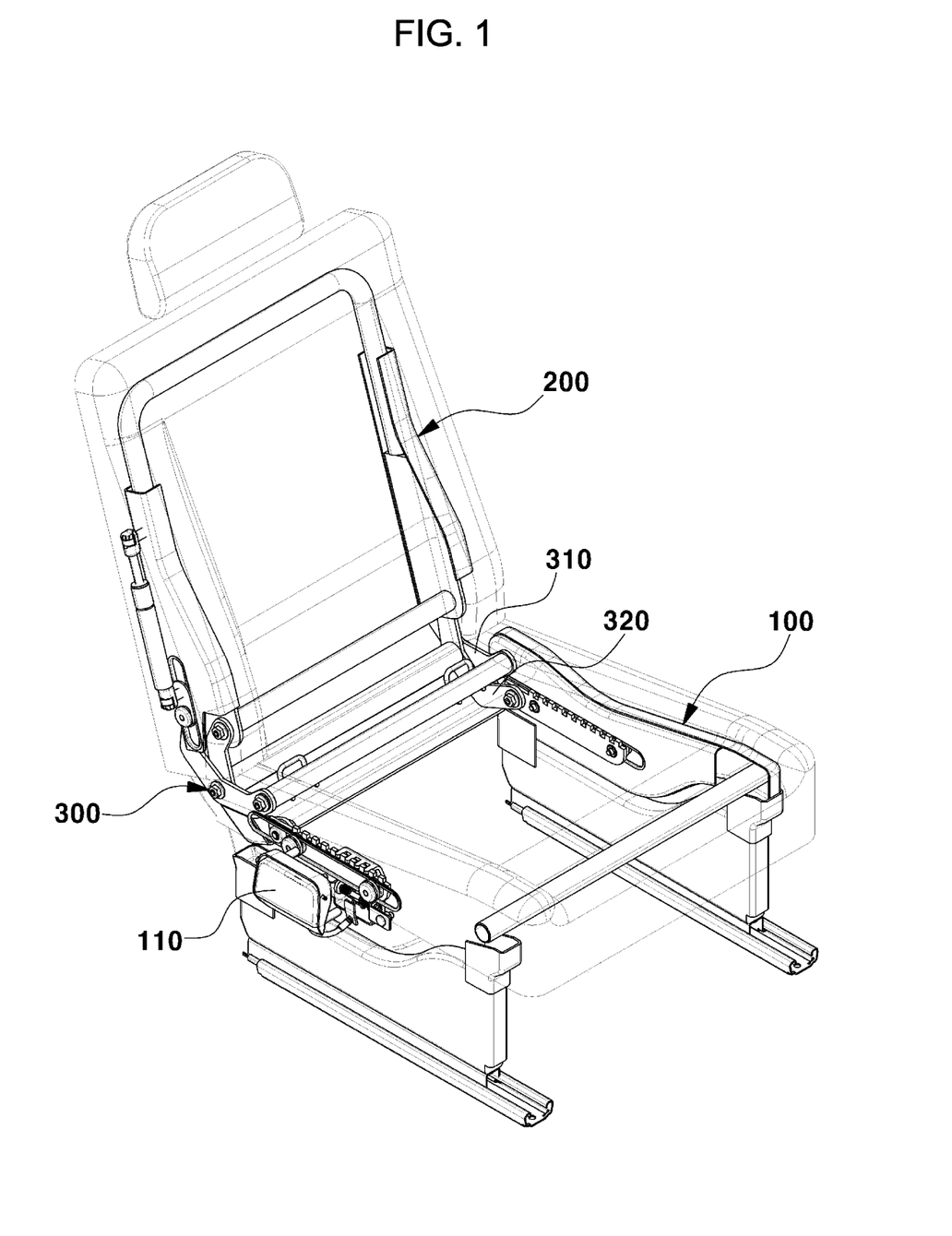
FIG. 1 is a perspective view of a device for adjusting an angle of a seatback for vehicles according to an embodiment of the present device.
Figure 2:
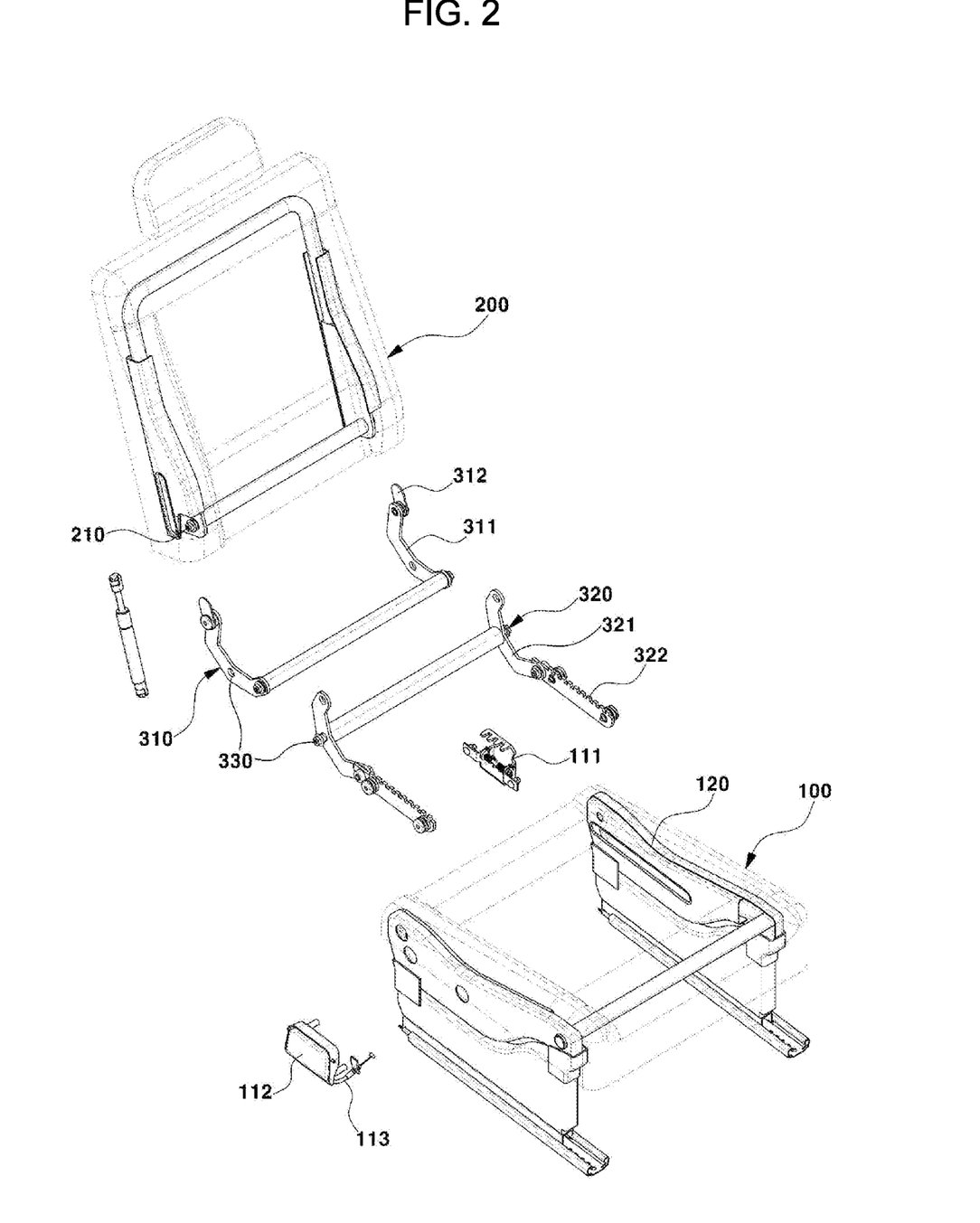
FIG. 2 is a view showing the configuration of the device for adjusting an angle of a seatback for vehicles according to the embodiment of the present device.
Figure 3:
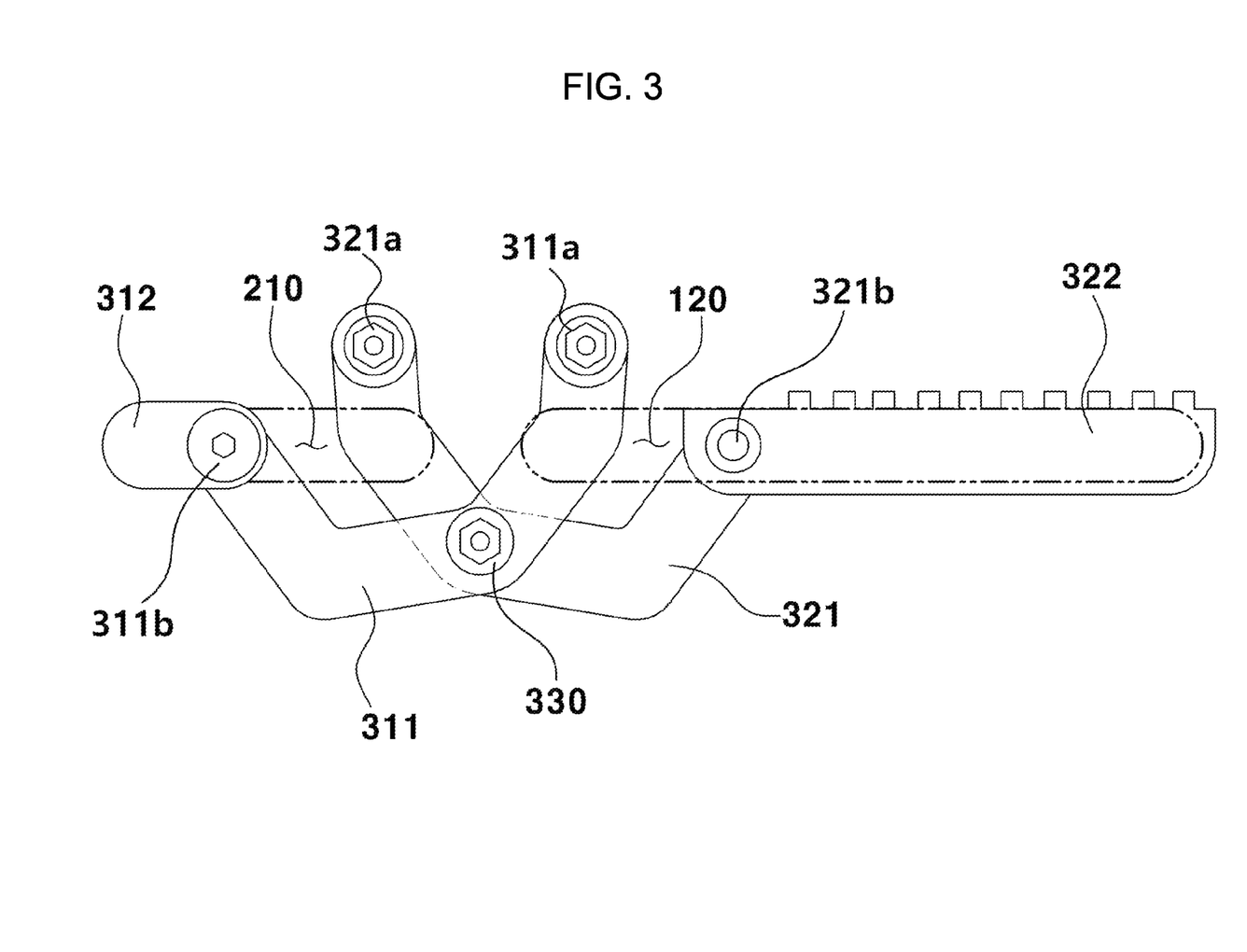
FIG. 3 is a cross-sectional view of a link unit of the device for adjusting an angle of a seatback for vehicles according to the embodiment of the present device.

FIG. 1 is a perspective view of a device for adjusting an angle of a seatback for vehicles according to an embodiment of the present device. FIG. 2 is a view showing the configuration of the device for adjusting an angle of a seatback for vehicles according to the embodiment of the present device. FIG. 3 is a cross-sectional view of a link unit of the device for adjusting an angle of a seatback for vehicles according to the embodiment of the present device.

Referring to FIGS. 1 to 3, the device for adjusting an angle of a seatback for vehicles according to the embodiment of the present device includes a seat cushion unit 100, a seatback unit 200, and a link unit 300. The seat cushion unit 100 is fixed to a vehicle body, and includes a locking part 110. The seatback unit 200 is rotatably connected to the seat cushion unit 100. The seatback unit 200 is formed on the upper portion of the seat cushion unit 100, and is configured to be rotated forward or backward about a hinge part connected to the seat cushion unit 100. The seatback unit 200 is configured to be rotated without interference with a rear end of the seat cushion unit 100.

The link unit 300 is configured to connect the seat cushion unit 100 to the seatback unit 200. The link unit 300 is located between the seat cushion unit 100 and the seatback unit 200 to connect the seat cushion unit 100 to the seatback unit 200.

In detail, the link unit 300 includes an upper link part 310, a lower link part 320, and a joint part 330. The upper link part 310 includes an end that is fixed to the seat cushion unit 100 to function as a rotation center axis and another end that is inserted into a back slot portion 210 formed in the seatback unit 200. The upper link part 310 includes an upper link 311 and an upper slide link 312.

As shown in FIG. 3, the upper link 311 is configured such that one end 311a thereof is fixed to the seat cushion unit 100 and the other end 311b thereof rotates about one end thereof. In an embodiment, the upper link 311 may be formed to have a curved center portion, and the other end thereof may be rotated about one end thereof. The upper slide link 312 is connected to the other end of the upper link 311. The upper slide link 312 is inserted into the back slot portion 210 so as not only to be rotated but also to move along the back slot portion 210 along with rotation of the upper link 311.

In detail, while the seatback unit 200 is rotated forward or backward, the upper slide link 312 moves along the back slot portion 210 while being rotated about the other end of the upper link 311.

The lower link part 320 includes an end that is fixed to the seatback unit 200 and another end that is inserted into a cushion slot portion 120 formed in the seat cushion unit 100 to be engaged with the locking part 110. The lower link part 320 includes a lower link 321 and a lower slide link 322.

As shown in FIG. 3, the lower link 321 is configured such that one end 321a thereof is fixed to the seatback unit 200 and rotates about the other end 321b thereof. In an embodiment, the lower link 321 may be formed to have a curved center portion, and one end thereof may be rotated about the other end thereof. The lower slide link 322 is connected to the other end of the lower link 321. The lower slide link 322 is inserted into the cushion slot portion 120 so as to move along the cushion slot portion 120 when the lower slide link 322 is unlocked from the locking part 110. In detail, while the seatback unit 200 is rotated forward or backward, the lower slide link 322 moves forward or backward along the cushion slot portion 120.

The joint part 330 is configured to allow the upper link part 310 and the lower link part 320 to be coupled thereto. In an example, the upper link part 310 and the lower link part 320 may be bolted to the joint part 330 so as to be rotated without interference with each other.

The device for adjusting an angle of a seatback for vehicles according to the embodiment of the present device is configured such that the seatback unit 200 is rotated forward or backward by rotation of the upper link part 310 and the lower link part 320. Preferably, the seatback unit 200 is configured to be rotated without interference while limiting the rotational angle by additional rotation of the lower link 321.

When the seatback unit 200 is rotated forward, the seatback unit 200 is additionally rotated about one end of the lower link 321 simultaneously with rotation of the upper link 311. When the seatback unit 200 is rotated forward, the upper slide link 312 moves to one end of the back slot portion 210 that is close to the seat cushion unit 100, and the lower slide link 322 moves to one end of the cushion slot portion 120 that is close to the seatback unit 200.

When the seatback unit 200 is rotated backward, the seatback unit 200 is additionally rotated about one end of the lower link 321 simultaneously with rotation of the upper link 311. When the seatback unit 200 is rotated backward, the upper slide link 312 moves to the other end of the back slot portion 210 that is far from the seat cushion unit 100, and the lower slide link 322 moves to the other end of the cushion slot portion 120 that is far from the seatback unit 200.

Figure 4:
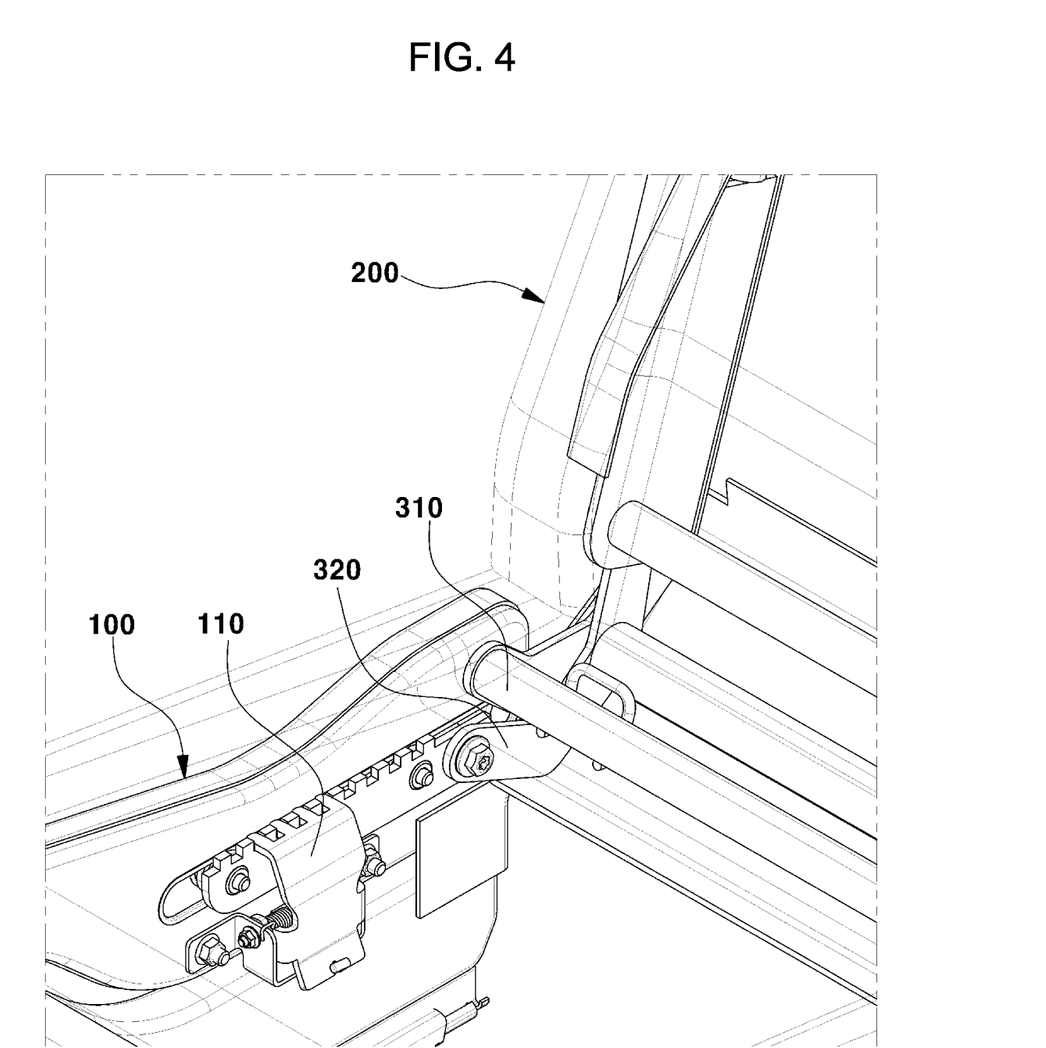
FIG. 4 is a perspective view of the device for adjusting an angle of a seatback for vehicles equipped with a locking part according to the embodiment of the present device.
Figure 5:
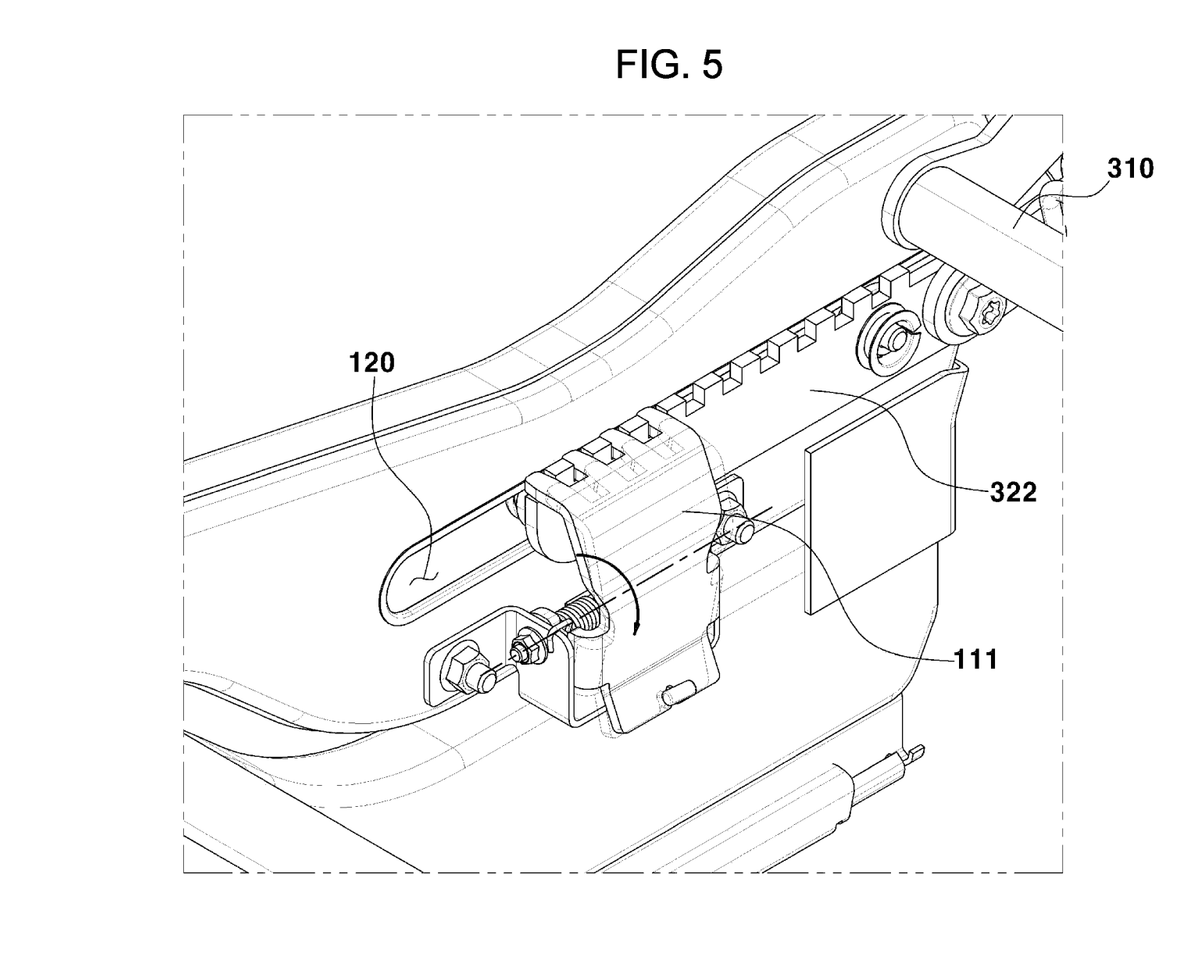
FIG. 5 is a view of a locking bracket of the device for adjusting an angle of a seatback for vehicles according to the embodiment of the present device.
Figure 6:
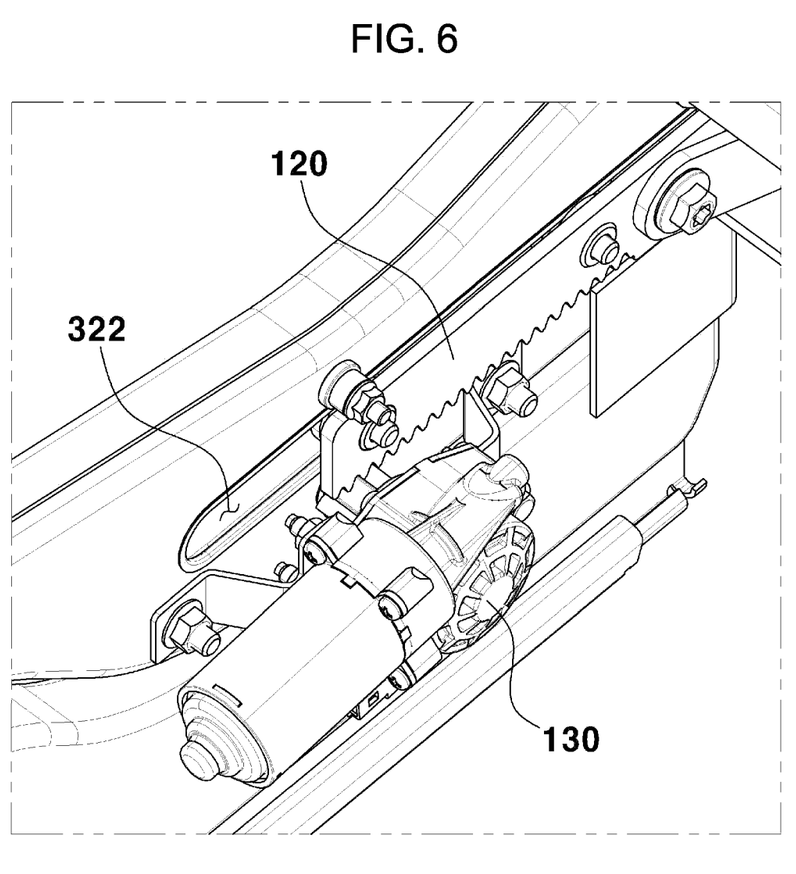
FIG. 6 is a view of a driving unit of the device for adjusting an angle of a seatback for vehicles according to the embodiment of the present device.

FIG. 4 is a perspective view of the device for adjusting an angle of a seatback for vehicles equipped with a locking part 110 according to the embodiment of the present device. FIG. 5 is a view of a locking bracket of the device for adjusting an angle of a seatback for vehicles according to the embodiment of the present device. FIG. 6 is a view of a driving unit of the device for adjusting an angle of a seatback for vehicles according to the embodiment of the present device.

Referring to FIGS. 4 to 6, the device for adjusting an angle of a seatback for vehicles according to the embodiment of the present device may be equipped with a locking part 110 that allows an occupant to manually rotate the seatback unit 200 forward or backward. A device for adjusting an angle of a seatback for vehicles according to another embodiment of the present device may be equipped with a driving unit 130 so as to be operated in an automatic mode.

The locking part 110 includes a locking bracket 111 and a locking lever 112. The locking bracket 111 is located in the seat cushion unit 100, and is configured to be engaged with the lower slide link 322. In an embodiment, the locking bracket 111 may include a latching portion formed so as to be fitted into a recess formed in the upper end of the lower slide link 322, and accordingly, may be engaged with the lower slide link 322.

The locking lever 112 is located outside the seat cushion unit 100, and is connected to the locking bracket 111 via a cable 113. In an embodiment, the locking lever 112 may be operated by an occupant rotating the upper end thereof. When the locking lever 112 is operated, tension is applied to the cable 113, and the locking bracket 111 is released from the lower slide link 322. When the locking bracket 111 is released from the lower slide link 322 by the occupant operating the locking lever 112, the occupant may manually rotate the seatback unit 200 forward or backward.

The driving unit 130 is engaged with the lower link part 320 inserted into the cushion slot portion 120. In detail, the driving unit 130 is engaged with the lower slide link 322 inserted into the cushion slot portion 120. The driving unit 130 is located in the seat cushion unit 100, and applies driving force to the lower slide link 322. In an embodiment, the driving unit 130 may be engaged with the lower end of the lower slide link 322, and may apply driving force to the lower slide link 322 so that the lower slide link 322 moves along the cushion slot portion 120.

Figure 7:
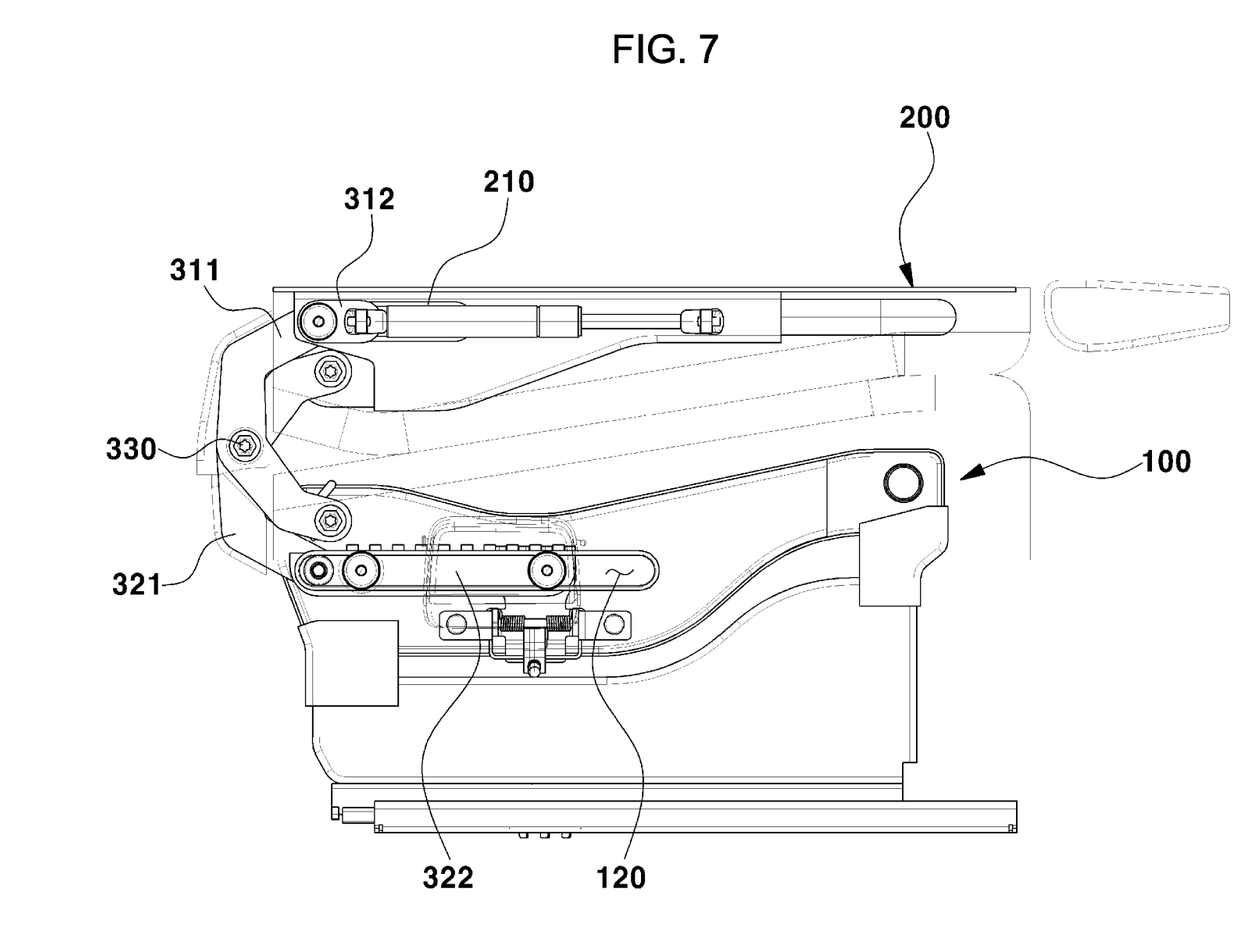
FIG. 7 is a view showing a fully folded state of a seatback unit of the device for adjusting an angle of a seatback for vehicles according to the embodiment of the present device.

FIG. 7 is a view showing a fully folded state of the seatback unit of the device for adjusting an angle of a seatback for vehicles according to the embodiment of the present device.

Referring to FIG. 7, in the device for adjusting an angle of a seatback for vehicles according to the embodiment of the present device, when the locking lever 112 is operated and the seatback unit 200 is rotated forward about one end of the upper link 311, the other end of the upper link 311 is rotated upward about one end thereof, and the lower link 321 receives rotational force from the upper link 311 through the joint part 330, whereby one end of the lower link 321 is rotated upward simultaneously with the upper link 311.

When the seatback unit 200 is fully rotated forward about one end of the upper link 311, the upper slide link 312 is located at one end of the back slot portion 210, and the lower slide link 322 is located at one end of the cushion slot portion 120.

In the automatic mode of the device for adjusting an angle of a seatback for vehicles according to the other embodiment of the present device, when the driving unit 130 applies driving force to the lower slide link 322 so that the lower slide link 322 is moved backward, the other end of the upper link 311 is rotated upward about one end thereof, and the lower link 321 receives rotational force from the upper link 311 through the joint part 330, whereby one end of the lower link 321 is rotated upward simultaneously with the upper link 311.

When the locking lever 112 is operated and the seatback unit 200 is rotated forward, the joint part 330 receives rotational force and is rotated, the other end of the upper link 311 is rotated, and the lower link 321 receives rotational force from the upper link 311 through the joint part 330, whereby one end of the lower link 321 is rotated. Accordingly, the seatback unit 200 is rotated forward about one end of the upper link 311, and the upper slide link 312 is located at one end of the back slot portion 210. At this time, the joint part 330 is moved upward in the height direction.

In detail, after the locking lever 112 is operated and the locking bracket 111 is released from the lower slide link 322, when the occupant rotates the seatback unit 200 forward, the lower slide link 322 is moved backward. When the seatback unit 200 is rotated forward, the joint part 330 is moved upward, and the other end of the upper link 311 is rotated upward about one end thereof. The lower link 321 connected to the upper link 311 via the joint part 330 is rotated simultaneously with the upper link 311.

The rotation of the lower link 321 and the rotation of the upper link 311 are combined to allow the seatback unit 200 to be rotated forward about one end of the upper link 311. In the state in which the seatback unit 200 is rotated forward 180°, the upper slide link 312 is located at one end of the back slot portion 210, and the lower slide link 322 is located at one end of the cushion slot portion 120.

One end of the lower link 321 functions as the rotation axis of the lower link 321. When the seatback unit 200 is rotated forward, the rotation axis of the lower link 321 is moved in the backward direction of the seat cushion unit 100. Accordingly, the seatback may be rotated forward without interference with the seat cushion.

When the seatback unit 200 is rotated forward, the joint part 330 is moved upward while escaping from the lower end of the seat cushion unit 100 to the outside of the upper end of the seat cushion unit 100. When the joint part 330 is moved upward, the seatback unit 200 is rotated in the forward direction of the seat cushion unit 100.

The back slot portion 210 limits movement of the upper slide link 312 to adjust the rotational angle of the seatback unit 200. In an embodiment, the upper slide link 312 may be moved in the back slot portion 210 in the longitudinal direction in response to a sum of the rotational angle of the lower link 321 and the rotational angle of the upper link 311. The displacement of the upper slide link 312 may correspond to a combination of the rotation of the lower link 321 and the rotation of the upper link 311.

When the seatback unit 200 is rotated forward, the upper slide link 312 is moved to one end of the back slot portion 210 that is close to the lower end of the seatback unit 200. FIG. 7 illustrates a state in which the upper slide link 312 is moved to one end of the back slot portion 210. The back slot portion 210 is configured to limit the displacement of the upper slide link 312. The length of the back slot portion 210 may vary depending on setting of the rotation amount of the seatback.

When the seatback unit 200 is rotated forward, the lower slide link 322 is moved to one end of the cushion slot portion 120 that is close to the rear end of the seat cushion unit 100. FIG. 7 illustrates a state in which the lower slide link 322 is moved to one end of the cushion slot portion 120. The cushion slot portion 120 is configured to limit the displacement of the lower slide link 322. The length of the cushion slot portion 120 may vary depending on setting of the rotation amount of the seatback.

Figure 8:
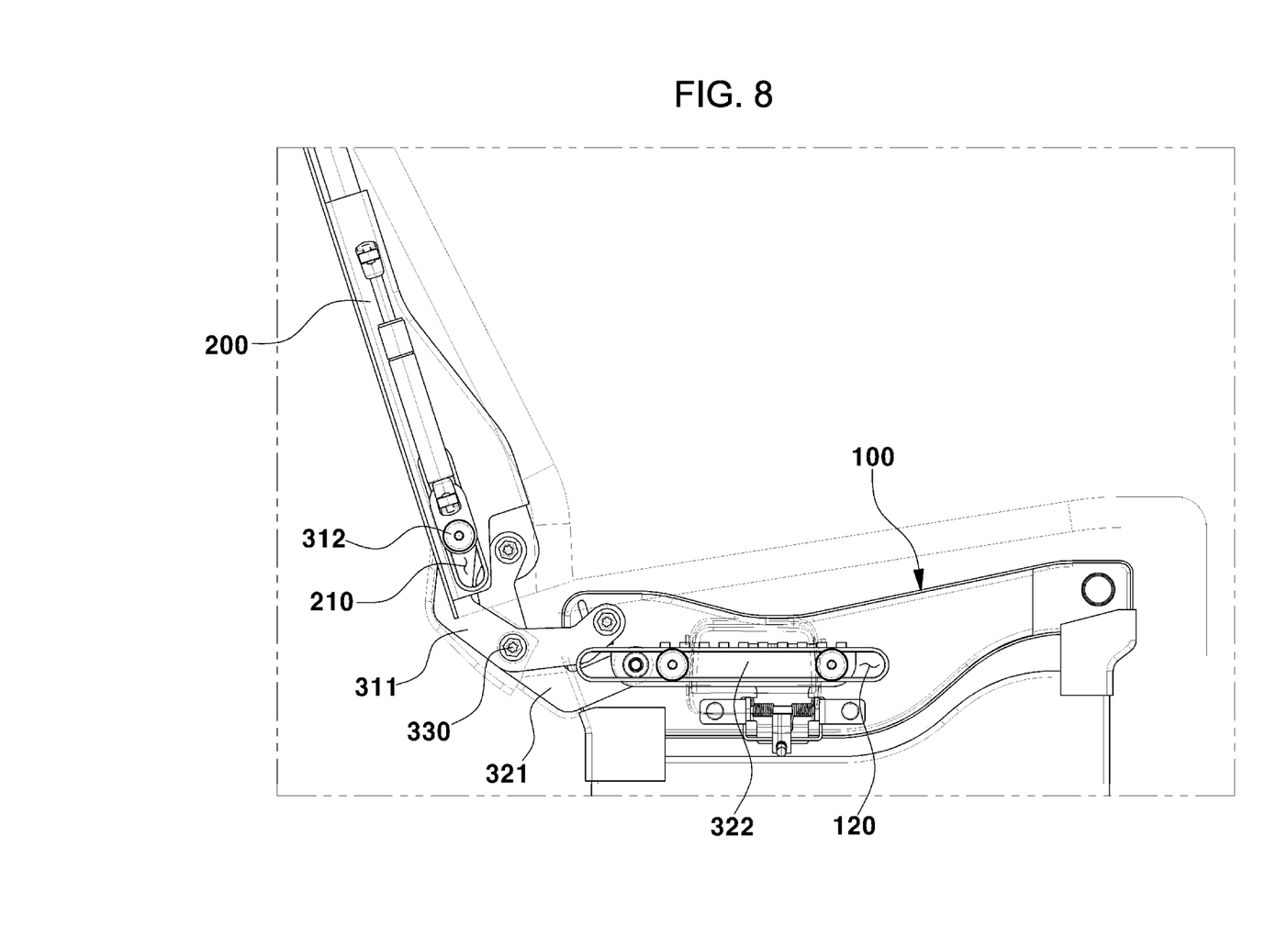
FIG. 8 is a view showing an erected state of the seatback unit of the device for adjusting an angle of a seatback for vehicles according to the embodiment of the present device.
Figure 9:
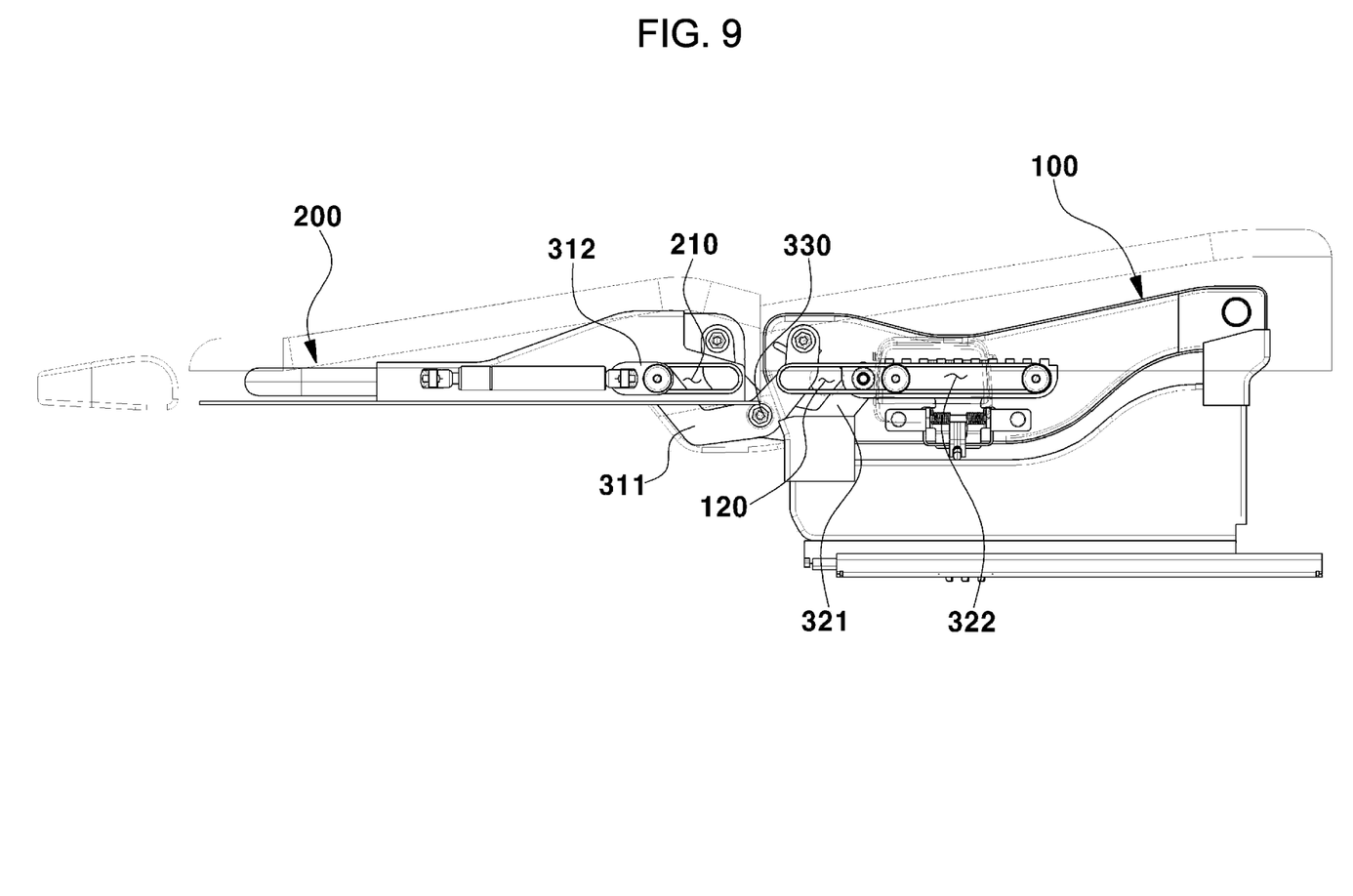
FIG. 9 is a view showing a fully unfolded state of the seatback unit of the device for adjusting an angle of a seatback for vehicles according to the embodiment of the present device.

FIG. 8 is a view showing an erected state of the seatback unit of the device for adjusting an angle of a seatback for vehicles according to the embodiment of the present device. FIG. 9 is a view showing a fully unfolded state of the seatback unit of the device for adjusting an angle of a seatback for vehicles according to the embodiment of the present device.

Referring to FIGS. 8 and 9, in the device for adjusting an angle of a seatback for vehicles according to the embodiment of the present device, when the locking lever 112 is operated and the seatback unit 200 is rotated backward about one end of the upper link 311, the other end of the upper link 311 is rotated downward about one end thereof, and the lower link 321 receives rotational force from the upper link 311 through the joint part 330, whereby one end of the lower link 321 is rotated downward simultaneously with the upper link 311.

When the seatback unit 200 is fully rotated backward about one end of the upper link 311, the upper slide link 312 is located at the other end of the back slot portion 210, and the lower slide link 322 is located at the other end of the cushion slot portion 120. In an embodiment, when the seatback unit 200 is rotated backward 90° about one end of the upper link 311 and is in an erected state, the upper slide link 312 may be located at the center of the back slot portion 210, and the lower slide link 322 may be located at the center of the cushion slot portion 120.

In the automatic mode of the device for adjusting an angle of a seatback for vehicles according to the other embodiment of the present device, when the driving unit 130 applies driving force to the lower slide link 322 so that the lower slide link 322 is moved forward, the other end of the upper link 311 is rotated downward about one end thereof, and the lower link 321 receives rotational force from the upper link 311 through the joint part 330, whereby one end of the lower link 321 is rotated downward simultaneously with the upper link 311.

When the locking lever 112 is operated and the seatback unit 200 is rotated backward, the joint part 330 receives rotational force and is rotated, the other end of the upper link 311 is rotated, and the lower link 321 receives rotational force from the upper link 311 through the joint part 330, whereby one end of the lower link 321 is rotated. Accordingly, the seatback unit 200 is rotated backward about one end of the upper link 311, and the upper slide link 312 is located at the other end of the back slot portion 210. At this time, the joint part 330 is moved downward in the height direction.

In detail, after the locking lever 112 is operated and the locking bracket 111 is released from the lower slide link 322, when the occupant rotates the seatback unit 200 backward, the lower slide link 322 is moved forward. When the seatback unit 200 is rotated backward, the joint part 330 is moved downward, and the other end of the upper link 311 is rotated downward about one end thereof. The lower link 321 connected to the upper link 311 via the joint part 330 is rotated simultaneously with the upper link 311.

The rotation of the lower link 321 and the rotation of the upper link 311 are combined to allow the seatback unit 200 to be rotated backward about one end of the upper link 311. In the state in which the seatback unit 200 is rotated backward 180°, the upper slide link 312 is located at the other end of the back slot portion 210, and the lower slide link 322 is located at the other end of the cushion slot portion 120.

One end of the lower link 321 functions as the rotation axis of the lower link 321. When the seatback unit 200 is rotated backward, the rotation axis of the lower link 321 is moved in the forward direction of the seat cushion unit 100. Accordingly, the seatback may be rotated backward without interference with the seat cushion.

When the seatback unit 200 is rotated backward, the joint part 330 is moved downward while escaping from the upper end of the seat cushion unit 100 to the outside of the lower end of the seat cushion unit 100. When the joint part 330 is moved downward, the seatback unit 200 is rotated in the backward direction of the seat cushion unit 100.

When the seatback unit 200 is rotated backward, the upper slide link 312 is moved to the other end of the back slot portion 210 that is close to the upper end of the seatback unit 200. FIG. 9 illustrates a state in which the upper slide link 312 is moved to the other end of the back slot portion 210.

When the seatback unit 200 is rotated backward, the lower slide link 322 is moved to the other end of the cushion slot portion 120 that is close to the front end of the seat cushion unit 100. FIG. 9 illustrates a state in which the lower slide link 322 is moved to the other end of the cushion slot portion 120.

In summary, the present disclosure provides a device for adjusting an angle of a seatback for vehicles, which may increase an angle adjustment range of the seatback unit 200 according to a body condition of an occupant using the dual-link-unit structure 300, may improve the comfort of an occupant by reducing a step between the seat cushion and the seatback when the seatback is fully unfolded, and may secure an interior space of a vehicle to the maximum when the seatback is unfolded or folded.

As is apparent from the above description, the present device exhibits the following effects through the above embodiments and through the configurations and combination and use relationships described above.

Since a dual-link-unit structure is employed, it is possible to increase an angle adjustment range of a seatback according to a body condition of an occupant, thereby improving the comfort of an occupant seated in a seat.

In addition, it is possible to secure an interior space of a vehicle to the maximum when the seatback is fully folded or unfolded.

The above description is illustrative of the present device. Also, the above disclosure is intended to illustrate and explain preferred embodiments of the present device, and the present device may be used in various other combinations, modifications, and environments. In other words, the present device may be changed or modified within the scope of the concept of the present device disclosed herein, within the equivalent scope of the disclosure, and/or within the skill and knowledge of the art. The described embodiments illustrate the best state of the art to implement the technical idea of the present device, and various changes may be made thereto as demanded for specific applications and uses of the present device. Accordingly, the above description is not intended to limit the present device to the embodiments. Also, the appended claims should be construed as encompassing such other embodiments.

What is claimed is:

1. A device for adjusting an angle of a seatback, the device comprising:
　a seat cushion comprising a locking part;
　a seatback rotatably connected to the seat cushion; and
　a link connecting the seat cushion to the seatback,
　　wherein the link comprises:

an upper link part comprising a first end fixed to the seat cushion to function as a rotation center axis and a second end configured to be inserted into a back slot portion formed in the seatback;
a lower link part comprising a third end fixed to the seatback and a fourth end configured to be inserted into a cushion slot portion formed in the seat cushion to be engaged with the locking part; and
a joint part configured to allow the upper link part and the lower link part to be coupled thereto, and
wherein the seatback is configured to be rotated forward or backward by rotation of the upper link part and the lower link part.

2. The device of claim 1, wherein the upper link part comprises:
an upper link comprising the first end fixed to the seat cushion and the second end formed to be rotatable about the first end of the upper link; and
an upper slide link connected to the second end of the upper link and configured to be inserted into the back slot portion so as to be moved along the back slot portion while being rotated along with rotation of the upper link, and
wherein the lower link part comprises:
a lower link comprising the third end fixed to the seatback and the fourth end about which the third end of the lower link is rotated; and
a lower slide link connected to the fourth end of the lower link and configured to be inserted into the cushion slot portion so as to be moved along the cushion slot portion when unlocked from the locking part.

3. The device of claim 2, wherein, when the seatback is rotated forward, the seatback is additionally rotated about the third end of the lower link simultaneously with rotation of the upper link, the upper slide link moves to an end of the back slot portion close to the seat cushion, and the lower slide link moves to an end of the cushion slot portion close to the seatback.

4. The device of claim 2, wherein, when the seatback is rotated backward, the seatback is additionally rotated about the third end of the lower link simultaneously with rotation of the upper link, the upper slide link moves to another end of the back slot portion far from the seat cushion, and the lower slide link moves to another end of the cushion slot portion far from the seatback.

5. The device of claim 2, wherein the locking part comprises:
a locking bracket located in the seat cushion to be engaged with the lower slide link; and
a locking lever located outside the seat cushion to be connected to the locking bracket via a cable.

6. The device of claim 5, wherein, when the locking lever is operated and the seatback is rotated forward about the first end of the upper link, the second end of the upper link is rotated upward about the first end of the upper link, and the lower link receives rotational force from the upper link through the joint part so that the third end of the lower link is rotated upward simultaneously with the upper link.

7. The device of claim 6, wherein the upper slide link is located at an end of the back slot portion, and the lower slide link is located at an end of the cushion slot portion.

8. The device of claim 5, wherein, when the locking lever is operated and the seatback is rotated backward about the first end of the upper link, the second end of the upper link is rotated downward about the first end of the upper link, and the lower link receives rotational force from the upper link through the joint part so that the third end of the lower link is rotated downward simultaneously with the upper link.

9. The device of claim 8, wherein the upper slide link is located at another end of the back slot portion, and the lower slide link is located at another end of the cushion slot portion.

10. A device for adjusting an angle of a seatback, the device comprising:
a seat cushion comprising a driving unit;
a seatback rotatably connected to the seat cushion; and
a link connecting the seat cushion to the seatback,
wherein the link comprises:
an upper link part comprising a first end fixed to the seat cushion to function as a rotation center axis and a second end configured to be inserted into a back slot portion formed in the seatback;
a lower link part comprising a third end fixed to the seatback and a fourth end configured to be inserted into a cushion slot portion formed in the seat cushion to be engaged with the driving unit; and
a joint part configured to allow the upper link part and the lower link part to be coupled thereto, and
wherein the seatback is configured to be rotated forward or backward by rotation of the upper link part and the lower link part.

11. The device of claim 10, wherein the upper link part comprises:
an upper link comprising the first end fixed to the seat cushion and the second end formed to be rotatable about the first end of the upper link; and
an upper slide link connected to the second end of the upper link and configured to be inserted into the back slot portion so as to be moved along the back slot portion while being rotated along with rotation of the upper link, and
wherein the lower link part comprises:
a lower link comprising the third end fixed to the seatback and the fourth end about which the third end of the lower link is rotated; and
a lower slide link connected to the fourth end of the lower link and configured to be inserted into the cushion slot portion so as to be moved along the cushion slot portion upon receiving driving force from the driving unit.

12. The device of claim 11, wherein, when the driving unit applies driving force to the lower slide link so that the lower slide link is moved backward, the second end of the upper link is rotated upward about the first end of the upper link, and the lower link receives rotational force from the upper link through the joint part so that the third end of the lower link is rotated upward simultaneously with the upper link.

13. The device of claim 12, wherein the upper slide link is located at an end of the back slot portion, the lower slide link is located at an end of the cushion slot portion, and the seatback is rotated forward about the first end of the upper link.

14. The device of claim 11, wherein, when the driving unit applies driving force to the lower slide link so that the lower slide link is moved forward, the second end of the upper link is rotated downward about the first end of the upper link, and the lower link receives rotational force from the upper link through the joint part so that the third end of the lower link is rotated downward simultaneously with the upper link.

15. The device of claim 14, wherein the upper slide link is located at another end of the back slot portion, the lower slide link is located at another end of the cushion slot portion, and the seatback is rotated backward about the first end of the upper link.

\* \* \* \* \*